Patented Oct. 7, 1947

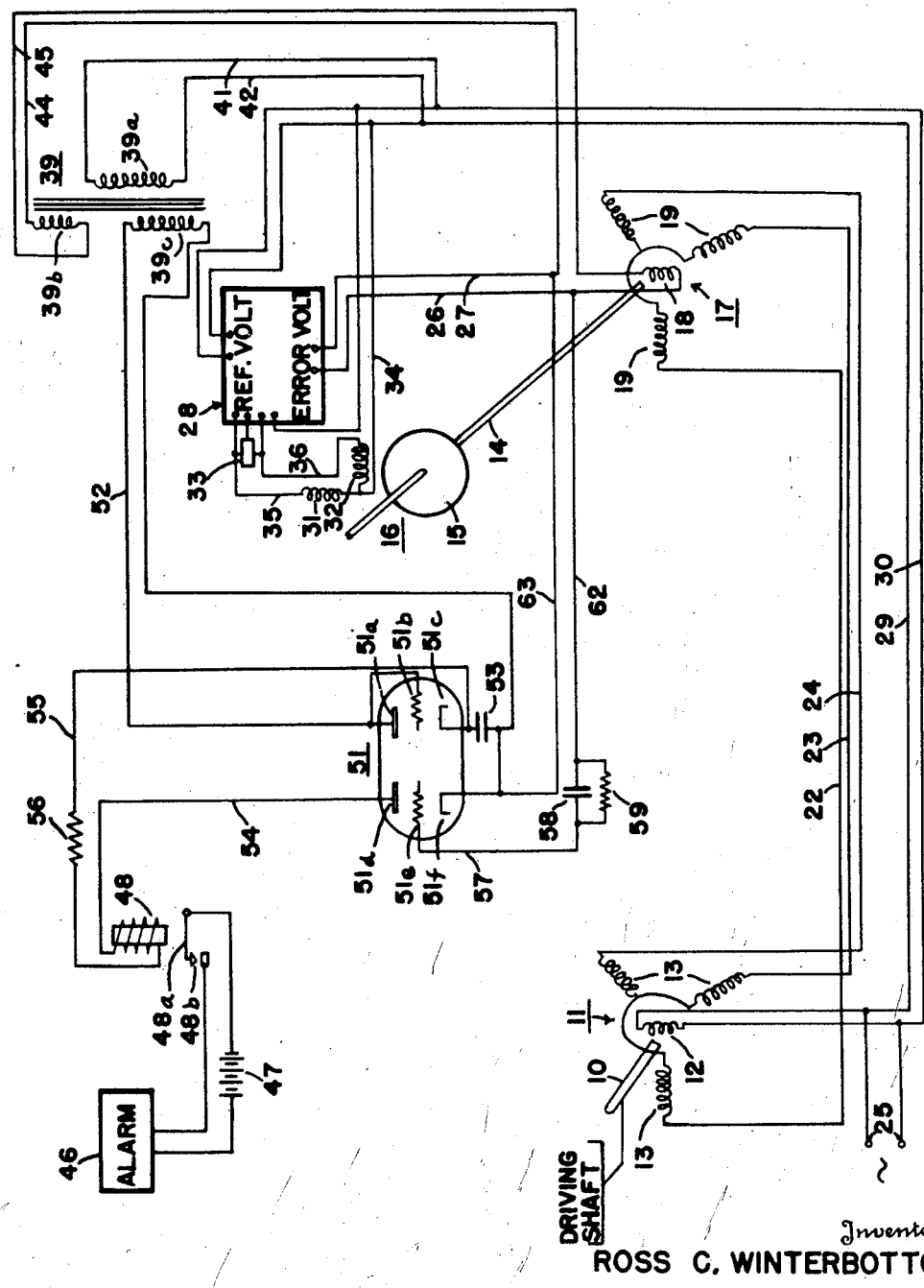

2,428,402

UNITED STATES PATENT OFFICE 2,428,402

NONCORRESPONDENCE ALARM FOR SYNCHROS

Ross C. Winterbottom, Washington, D. C.

Application February 17, 1945, Serial No. 578,426

8 Claims. (Cl. 177—311)

(Granted under the act of March 3, 1883, as amended April 30, 1928; 370 O. G. 757)

With many different types of equipment, such as for example, gun directors, radar, compass repeaters, searchlights, position indicators, etc., it is often necessary to include a system whereby angular motion of a shaft at one station be made to follow accurately the angular motion of another shaft located remotely from the first mentioned one. If the shafts are not too far away from each other, this result can be obtained by means of direct mechanical linkage. However this method is in general cumbersome and uneconomical, particularly where large amounts of torque and power are to be transferred. A method which is more flexible and more commonly used is to convert the angular motion of the driving shaft at the motion transmitting station into electrical energy, transfer this energy to the motion receiving station and there convert the energy back into angular motion of the driven shaft at this station.

Many different types of electrically operated motion transmission systems are on the market and are sold under various trade names. Some operate on alternating current and some on direct current. However, all of them exhibit a very low torque transmitting characteristic and hence where considerable torque is required of the driven shaft at the receiver station, it is necessary to provide some type of torque amplifying device, or servo system as it is commonly known, which is coupled to the driven shaft. Action of the torque amplifier is regulated by the error or discrepancy in angular position between the driving and driven shafts.

For example, in an ordinary radar antenna control, a motion transmitter, the rotor element of which is operated by a small handwheel, is positioned at a convenient control station. Near the antenna itself there is located a motion receiver device and a torque amplifier which may comprise a reversible electric motor. The shaft of this motor drives the antenna and is also coupled to the rotor element of the motion receiver device. When the rotor elements of the motion transmitter and receiver units are aligned there is no action at the torque amplifier. However, when the handwheel, coupled to the rotor element of the transmitter unit, is turned to a new angular position, there will momentarily be set up in the motion transmission system an "error" voltage which varies as the instant discrepancy in angular position of corresponding reference points on the rotor elements of the motion transmitter and receiver devices. The torque amplifier then responds to the "error" voltage and functions to cause the motor to rotate the antenna and hence also the rotor element of the motion receiver device until the "error" voltage is reduced to a null. The motion receiver device is thus brought into alignment with the new position of the motion transmitter device. This action is continuous as the rotor element of the motion transmitter is turned and so causes the antenna to rotate synchronously therewith.

In the radar, and many other applications incorporating a torque amplifier at the receiver, it is most necessary that the driven shaft track accurately with the driving shaft, even to a fraction of a degree. If, for any reason, the two shafts get out of step with each other, it is evident that correct operation of the equipment incorporating the motion transmitting system will no longer be obtained. In view of this, it has been the practice to incorporate some type of alarm to indicate faulty operation. While alarms for motion transmission systems are not broadly new, it is considered that the particular type of alarm device constituting the subject matter of this invention is highly novel and that it has many advantages not heretofore obtainable.

It is therefore the general object of this invention to provide an improved alarm for a self synchronous angular motion transmission system which will indicate failure of the motion receiver device to follow faithfully all motion of the motion transmitter device.

Another object is to provide an improved alarm which is actuated in response to a preselected increase in the "error" voltage that is present in motion transmission systems of the class described.

Still another object is to provide an improved alarm for motion transmission systems of the class described which is actuated automatically upon failure of the source of power which is required for operating the system.

Reference is now made to the single sheet of drawing upon which appears, in schematic diagram, a preferred embodiment of my invention as applied to an angular motion transmission system of the alternating current type, and which includes a servo-motor or torque amplifier connected to the driven shaft at the motion receiver station. A shaft 10 (which may be termed the driving shaft) is coupled to the rotor element of a self-synchronous motion transmitter unit 11. This unit which may be of any one of the types well-known in the trade and sold under various trade-marks such as Selsyn, Autosyn, Synchro, etc., includes on the rotor element a winding 12 which is sometimes referred to as the field winding. The stator element of the transmitter carries a poly-circuit, distributed winding 13 which is often referred to as the armature winding. This winding is tapped at the 120° points. In this particular embodiment, the armature winding 13 is shown Y connected although it may sometimes be found connected in Δ. Likewise in this embodiment, the field winding 12 is shown on the rotor element and the armature winding 13 on the stator element but these may be reversed if desired.

At the motion receiver station there is located a driven shaft 14 and it will be noted that this shaft is connected to the rotor element 15 of a two-phase A. C. motor 16 which is utilized to produce the requisite amount of torque at the output or load end of shaft 14. Motor 16 thus functions as the mechanical power amplifier or servo-motor previously referred to.

Also located at the motion receiver station is a control transformer 17 which includes rotor and stator elements. The physical construction of transformer 17 is essentially the same as that of transmitter 11 at the motion transmitter station. That is, the rotor element of the transformer, which is coupled to driven shaft 14 contains a field winding 18, and the stator element carries a poly-circuit distributed winding 19 which is Y connected. Like points on the windings 13 and 19 of the generator 11 and transformer 17, respectively, are connected together via conductors 22—24.

The field winding 12 of transmitter 11 is excited with single phase alternating current which is obtained from any suitable A. C. supply line such as terminals 25.

In a self-synchronous motion transmitting system of the type where no torque amplifier is coupled to the driven shaft, the control transformer just described would function as the receiver element to drive the driven shaft 14. The poly-circuit winding on the stator element of the transformer would be connected as shown but the field winding on the rotor element would be connected to the field winding of the transmitter unit and to the A. C. supply line referred to. With such an arrangement, when the rotors of the transmitter and receiver units were in the same angular positions with respect to their stators, the voltages induced in the respective interconnected armature windings by their associated field windings would be equal and opposite. However, if the rotor of the transmitter were to be turned through an angle and held in its new position, the voltages would no longer counterbalance, and equalizing currents would accordingly flow in the armature windings. Such currents would exert a torque on the rotor of the receiver causing it to take up a position corresponding to the position of the transmitter rotor.

However, in a motion transmission system of the general kind to which this invention relates, i. e. one in which a torque amplifier is interposed in the driven shaft, the field winding 18 on control transformer 17 instead of being connected to the A. C. line, is connected via conductors 26, 27 to terminals marked "Error voltage" on a control unit 28 which functions to control both the speed and direction of rotation of motor 16. It should be noted that the same A. C. voltage which is applied to the field winding 12 on transmitter 11 is also applied to terminals marked "Reference voltage" on the motor control unit 28.

The field circuit of servo-motor 16 is comprised of a pair of windings 31, 32 and a phase shifting capacitor unit 33. A conductor 34 leads from a common terminal on both of these windings to one side of the A. C. supply previously referred to. Conductors 35, 36 lead respectively from the other ends of field windings 31 and 32 to terminals on the control unit 28. The latter selectively connects capacitor 33 in series with one or the other of field windings 31, 32.

In operation, when the driving shaft 10 and driven shaft 14 are angularly aligned, there is but little or no voltage induced in the field winding 18 on the rotor element of control transformer 17. This position of the transformer rotor is often referred to as the "null." However, when the shaft 10 and hence field winding 12 on transmitter 11 is rotated through a selected angle, currents will be set up in the conductors 22—24 and these will shift the direction of the resultant magnetic field created by the armature winding 19 on the stator of control transformer 17. As the magnetic field shifts in direction, an "error" voltage is induced in the field winding 18 of this transformer. This "error" voltage is fed over conductors 26, 27 into the control unit 28 where it is applied in a bias amplifier which functions to vary an impedance in series with the field windings 31, 32 of motor 16 to thereby control its speed of rotation. The "error" voltage is also fed to a direction amplifier within control unit 28 where its phase is compared with the phase of the reference voltage, i. e. the voltage taken from terminals 25, in order to control the direction of rotation of motor 16. Included in the circuit of the direction amplifier is the coil of a relay and operation of the latter selects the particular motor field winding, 31 or 32, with which the capacitor unit 33 is connected in series. When this capacitor is connected in series with field winding 31, the rotor 15 of motor 16 will run in one direction; when it is connected in series with field winding 32, the motor rotor 15 will run in the opposite direction.

The control unit 28, and elements 31 through 36, may comprise an amplifier and motor combination, of a type well known to the servo-mechanism art, for operation in connection with alternating current data transmission systems. One such instrument has been depicted in the drawing as the control unit 28, and it comprises a phase responsive rectifier circuit whose output, through an anti-hunt network, controlling a pair of vacuum tubes acting as variable impedances between conductors 30 and conductors 35 and 36 respectively.

Thus as the "error" voltage induced in the field winding 18 on control transformer 17, is applied to the components of the control unit 28, the rotor 15 of motor 16 will be caused to rotate in such direction as to bring the rotor of control transformer 17 to a new position such that the "error" voltage induced in the field winding 18 is reduced to the "null" point value. Under normal conditions of operation, the rotor 15 of servo-motor 16 begins to move as soon as any "error" voltage first begins to appear. Hence the latter never reaches a value of any consequence when the system is operating synchronously; that is, when shaft 14 is faithfully repeating the motion of shaft 10.

The present circuit arrangement includes a transformer 39. Its primary winding 39a is connected via conductors 41, 42 to conductors 29, 30 and hence is supplied with alternating current from terminals 25. A secondary winding 39b on transformer 39 produces a small voltage of about 2.5 volts and this voltage is connected via conductors 44, 45 in series with the "error" voltage induced in rotor winding 18. In normal operation, the 2.5 volts obtained from secondary 39b does not introduce any "error" voltage signal into the system since it is compensated for or "backed out" by an initial adjustment of the "zero" position of the rotor element of control transformer 17. The reason for the inclusion of the small supplementary 2.5 volt potential will be explained in detail in a later part of this specification.

Except for the transformer 39, the self-synchronous motion transmission system appearing on the drawing, and which has been described, is conventional and its components per se accordingly do not constitute any part of the present invention. As explained in the opening part of this specification, this invention is concerned with the provision of a novel type of alarm circuit which can be incorporated with a self-synchronous motion transmission system in order to give an alarm when a driven element, such as shaft 14, fails to follow faithfully the motion of a driving element, such as shaft 10. Depending upon the particular type of self-synchronous motion transmission apparatus involved, failure of the driven element to follow the driving element may be caused by any one of a number of possible conditions. For example, in the particular apparatus illustrated, interruption of the alternating current power supply at terminals 25 will cause the system to fail. Faulty operation of the servo may throw the driving and driven elements out of synchronism. Likewise any breakdown in the connections between the armature windings 13 and 19 of the transmitter 11 and control transformer 17, respectively, resulting in loss of the "backing" voltage and "error" voltage will cause the driving and driven elements to fall out of synchronism with each other. Also any breakdown in the connections 29 and/or 30, resulting in loss of reference voltage at the servo will likewise cause the driving and driven elements to get out of step.

The alarm circuit constituting this invention, and which will now be described, functions to give an alarm when any of the aforesaid breakdown conditions occur.

In particular, the alarm circuit is comprised of any conventional type of alarm unit 46 which may take the form of a light, bell, buzzer, etc., a source of power supply such as battery 47 for energizing the alarm, and a relay 48 connected in circuit between the alarm 46 and the battery 47. For controlling the operation of relay 48 which is normally in an energized state there is provided a double triode 51 which may be a type 6SN7 valve. With respect to the right half of this valve which includes anode 51a, grid 51b and cathode 51c, it will be seen that the grid 51b is connected directly to the anode 51a to thereby constitute a half wave rectifier for supplying potential for the anode-cathode circuit of the left half of the valve 51, which half comprises anode 51d, control grid 51e and cathode 51f.

Alternating current from secondary winding 39c of transformer 39 is fed over conductor 52 to the anode 51a of the rectifier half of the valve and cathode 51c is connected via capacitor 53 to cathode 51f. This capacitor serves to minimize the ripple in the direct current output from the rectifier half of the valve. From the anode 51d of the left half of valve 51, a conductor 54 leads to one terminal of the energizing winding for relay 48, and another conductor 55 extends from the other terminal of this relay winding to the cathode 51c via resistor 56.

The left half of valve 51 constitutes an electronic control device or variable impedance and in this connection it will be seen that a conductor 57 extends from grid 51e through parallel connected capacitor 58 and resistor 59, and over conductor 62 to conductor 26. Another conductor 63 extends from conductor 27 to the cathode 51f of tube 51. It will now be evident that the grid-cathode circuit of the left half of tube 51 is connected in parallel with the output of field winding 18 on the rotor element of control transformer 17.

It was previously explained that when the self-synchronous motion transmission system is functioning properly, the magnitude of the "error" voltage which appears across the output of the field winding 18 of control transformer 17 never reaches an appreciable value because the shaft 14 by its rotation is constantly adjusting the rotor of the control transformer 17, upon which the field winding 18 is wound, to its "null" position. However, if we assume a condition of faulty operation wherein the driven shaft 14 gets out of step with the driving shaft 10, that is to say, a condition under which a reference point on shaft 14 is no longer angularly aligned with a corresponding reference point on shaft 10, the "error" voltage induced in the field winding 18 and which appears at the output thereof on conductors 26 and 27 will rise to an appreciable value. This may be caused by a fault in the servo-motor 15 or control unit 28 or for some other reasons. Whatever may be the reason as this "error" voltage is applied to the grid-cathode circuit of the left half of tube 51, it builds up a negative charge on capacitor 58 which biases the grid 51e negatively with respect to cathode 51f thereby reducing the current through the anode-cathode circuit of the left half of the tube 51. It was explained that this particular anode-cathode circuit includes the energizing winding of relay 48 and therefore the current through this winding is reduced as the negative bias builds up upon the grid 51e of the tube 51. Consequently when the negative bias on grid 51e has reached a critical limiting value, its effect upon the flow of current in the anode-cathode circuit of the left half of tube 51 will be such that the relay 48 will no longer be able to hold in its armature 48a. Consequently the latter will move downwardly to a position closing contacts 48b and hence completing a circuit between the alarm device 46 and the battery 47. This then actuates the alarm device 46 to give a signal to the operator which will indicate to him that the driving shaft 10 and driven shaft 14 are no longer in step with each other.

The value of resistor 56 can of course be so selected that the alarm device will be actuated when the "error" voltage has risen to any desired upper limit.

It has been explained that the right half of the tube 51 constitutes a rectifier for supplying the anode potential for the left hand of this tube and that the rectifier half of the tube 51 is fed with A. C. from the secondary 39c of transformer 39. Since the primary winding 39a of transformer 39 is supplied with A. C. from terminals 25, which terminals also feed the field winding 12 on the rotor element of transmitter 11, it will thus be evident that any failure which occurs in the A. C. supply appearing at terminals 25 will likewise result in a failure of the anode potential derived from the rectifier half of tube 51 and likewise a failure in current flow through the energizing winding of relay 48. Under these conditions the relay armature moves downwardly closing contacts 48b which thereby actuates the alarm device 46.

It has been explained that a small potential of approximately 2.5 volts obtained from secondary 39b of transformer 39 is connected in series with the output of the field winding 18 on the rotor element of control transformer 17, and that under normal operating conditions when the shafts 10 and 14 are rotating synchronously, this supplementary potential of 2.5 volts does not adversely affect operation of the system since it is properly compensated for by an initial adjustment of the "zero" position of the rotor element of control transformer 17. Keeping this in mind, if it should now be assumed that there is a breakdown in one or more of the conductors 22—24 interconnecting armature windings 13 and 19 of the transmitter 11 and control transformer 17, respectively, or should any other condition arise wherein the armature winding 19 on the control transformer 17 was not receiving current from transmitter 11, there will no longer be any "error" voltage induced in the field winding 18 of control transformer 17. However, from the drawing it will be evident that the supplementary potential of 2.5 volts obtained from secondary 39b of transformer 39 will still be available and will act to create a corresponding negative bias on the grid 51e of the left half of tube 51. This amount of bias will be sufficient to so decrease the current flow through the anode-cathode circuit including the winding of relay 48 that the relay armature 48a will move downwardly to close contacts 48b and thereby actuate the alarm device 46.

From what has been said, it will now be evident that the novel alarm circuit which has been described will function to give an alarm under any one or more of the following four conditions:

1. Faulty operation of the torque amplifier components causing the driven shaft 14 to get out of step with the driving shaft 10.
2. Failure of power supply for the field winding 12 of the motion transmitter unit 11, and/or failure of power supply on leads 29, 30.
3. Open circuit in two or more of the leads 22, 23 and 24, or a short circuit involving all three of these leads.
4. Any failure of any components of the alarm circuit itself causing a loss of current to relay coil 48.

In conclusion it is to be understood that while I have illustrated a preferred embodiment of my invention as applied to a self-synchronous motion transmittion system of the alternating current type utilizing a two-phase reversible motor at the motion repeater station to provide an amplified torque to the output of the driven shaft, the invention may be applied equally as well to any other type of self-synchronous motion transmission system, either alternating or direct current, which operates on the same principles as the particular alternating current apparatus illustrated. That is to say, any system in which an "error" voltage induced or produced at the motion repeater station as a result of motion at the transmitter station is utilized to selectively control the operation of a torque amplifier connected to the driven shaft.

The invention described herein may be manufactured and used by or for the Government of the United States of America for governmental purposes without the payment of any royalties thereon or therefor.

What is claimed is:

1. In an electrical system for the transmission of angular motion including a motion transmitter device, a motion receiver device, a power supply for said devices, electrical connections between said devices and a torque amplifier connected to the motion receiver device, and wherein momentarily any change in the angular position of the transmitter device relative to that of the receiver device momentarily produces an error voltage variable as the difference in the angular positions of the two devices for so controlling the torque amplifier that the receiver device then follows the angular change in the transmitter device, an alarm apparatus for indicating failure of the receiver device to follow faithfully the transmitter device, said apparatus comprising; an alarm, a relay for controlying operation of said alarm, a source of potential for the winding of said relay, said potential being derived from said power supply, an impedance, means connecting said relay winding in circuit with said source of potential and said impedance, and means for increasing said impedance in accordance with an increase of said error voltage.

2. The combination in claim 1 wherein said variable impedance is comprised of an electronic valve including cathode, control grid and anode elements, and said error voltage constitutes a source of negative grid bias for said valve.

3. The combination in claim 1 wherein said variable impedance is comprised of an electronic valve including, cathode, control grid and anode elements, a capacitor connected in the grid-cathode circuit of said valve, and means for charging said capacitor to a negative potential with respect to said cathode, said potential being variable with said error voltage.

4. In an electrical system for the transmission of angular motion including a motion transmitter unit having rotor and stator elements, a field winding carried by one of said elements and a poly-circuit armature winding carried by the other element, a control transformer having similar windings and elements, electrical connections between the armature windings of said transmitter unit and control transformer, a source of alternating current connected to the field winding of said transmitter unit, and a torque amplifier connected to the rotor element of said control transformer, and wherein momentarily any change in the angular position of the rotor element of said transmitter unit relative to the rotor element of said control transformer momentarily induces at the output of the field winding of said control transformer an error voltage variable as the difference in the angular positions of the two said rotor elements and which so controls the torque amplifier that the rotor element of said control transformer follows the said angular change in the rotor element of the transmitter unit, an alarm apparatus for indicating failure of the two said rotor elements to rotate synchronously, said apparatus comprising; an alarm, a relay for controlling operation of said alarm, a source of potential for the winding of said relay, derived from said alternating current source, an impedance, means connecting said relay winding in circuit with said source of potential and said impedance, and means for increasing said impedance in accordance with an increase of said error voltage.

5. The combination in claim 4 wherein said variable impedance is comprised of an electronic valve including cathode, control grid and anode elements, and said error voltage constitutes a source of negative grid bias for said valve.

6. The combination in claim 4 wherein said variable impedance is comprised of an electronic valve including cathode, control grid and anode elements, a capacitor connected in the grid-cathode circuit of said valve, and means for charging said capacitor to a negative potential with respect to said cathode, said potential being variable with said error voltage.

7. In an electrical system for the transmission of angular motion including a motion transmitter unit having rotor and stator elements, a field winding carried by one of said elements and a poly-circuit armature winding carried by the other element, a control transformer having similar windings and elements, electrical connections between the armature windings of said transmitter unit and control transformer, a source of alternating current connected to the field winding of said transmitter unit, and a torque amplifier connected to the rotor element of said control transformer, and wherein momentarily any change in the angular position of the rotor element of said transmitter unit relative to the rotor element of said control transformer momentarily induces at the output of the field winding of said control transformer an error voltage variable as the difference in the angular position of the two said rotor elements and which controls the torque amplifier that the rotor element of said control transformer then follows the said angular change in the rotor element of the transmitter unit, an alarm apparatus for indicating failure of the two said rotor elements to rotate synchronously, said apparatus comprising: an alarm, a relay for controlling operation of said alarm, an electronic valve including a cathode, control grid and anode elements, means connecting the winding of said relay in a circuit including the anode and cathode elements of said valve and a source of potential derived from the same source which supplies the alternating current to the field winding of said motion transmitter unit, and means for varying the current flow through the anode-cathode circuit of said valve and hence the current flow through the winding of said relay, last said means comprising a negative bias applied to the control grid of said valve, said negative bias being variable in accordance with variation of said error voltage.

8. The combination in claim 7 and further including, a supplementary potential connected in series with the output of the field winding of said control transformer, last said voltage being normally backed out and having no effect upon the operation of said torque amplifier when the motion transmission system is operating synchronously but which becomes effective upon failure of inductive coupling between the field and armature windings of said control transformer to constitute a potential for deriving negative bias for the grid of said valve to thereby affect current flow through the cathode-anode circuit of said valve and hence also through the winding of said relay.

ROSS C. WINTERBOTTOM.

REFERENCES CITED

The following references are of record in the file of this patent:

UNITED STATES PATENTS

| Number | Name | Date |
|---|---|---|
| 706,281 | Thiermann | Aug. 5, 1902 |
| 1,576,189 | Hewlett et al. | Mar. 9, 1926 |
| 2,154,065 | Davis et al. | Apr. 11, 1939 |
| 2,237,225 | Henschmann | Apr. 1, 1941 |